W. AKEMANN.
APPARATUS FOR STABILIZING A DIRECTION IN SPACE.
APPLICATION FILED SEPT. 3, 1920.

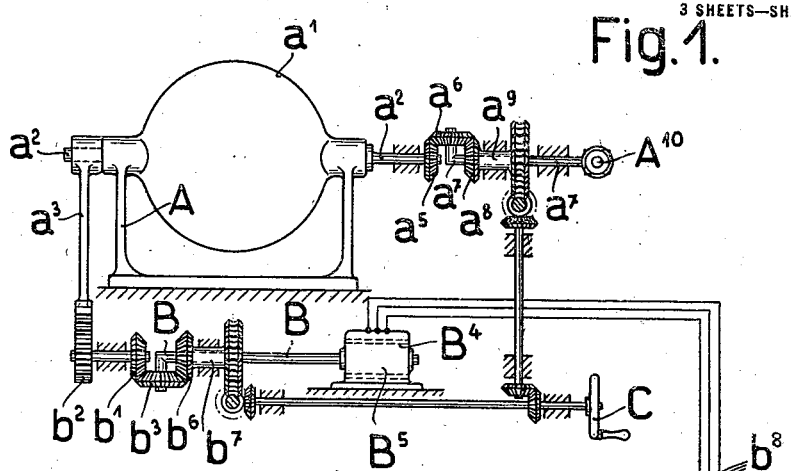
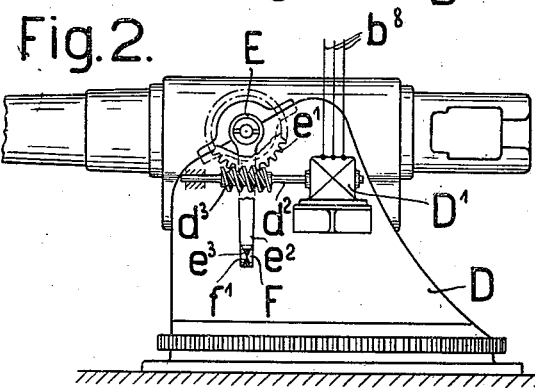
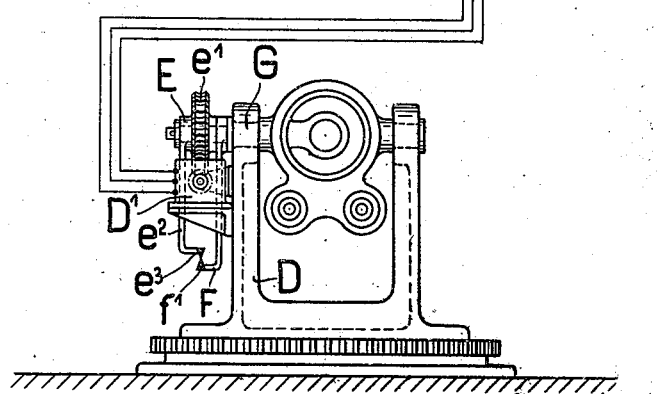

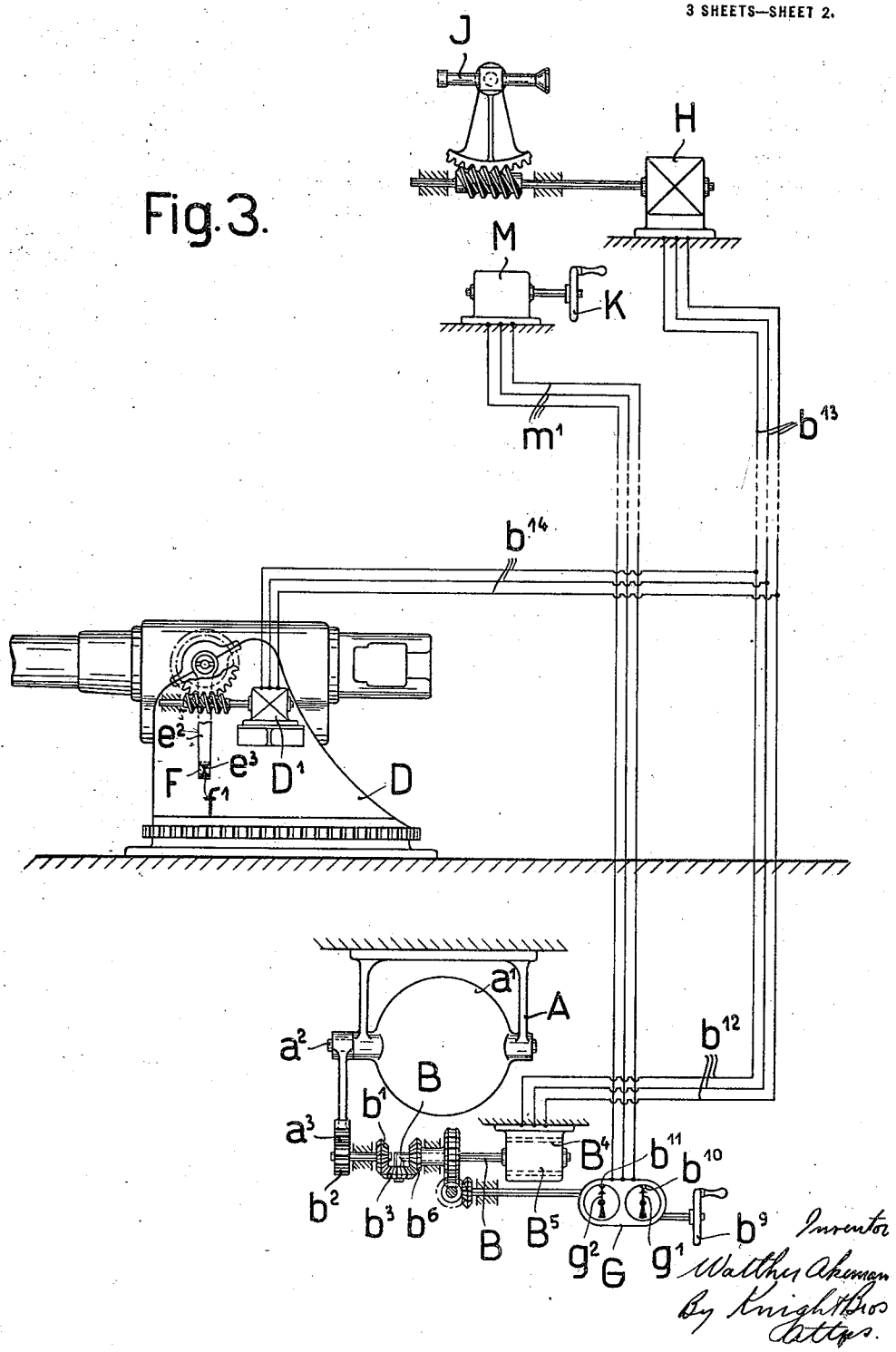

1,435,681.

Patented Nov. 14, 1922.
3 SHEETS—SHEET 3.

Patented Nov. 14, 1922.

1,435,681

UNITED STATES PATENT OFFICE.

WALTHER AKEMANN, OF ESSEN, GERMANY, ASSIGNOR TO FRIED. KRUPP AKTIEN-GESELLSCHAFT, OF ESSEN-ON-THE-RUHR, GERMANY.

APPARATUS FOR STABILIZING A DIRECTION IN SPACE.

Application filed September 3, 1920. Serial No. 408,073.

*To all whom it may concern:*

Be it known that I, WALTHER AKEMANN, residing at Essen, Germany, a citizen of the German Republic, have invented a certain new and useful Improvement in Apparatus for Stabilizing a Direction in Space (for which I have filed application in Germany, January 7th, 1918), of which the following is a specification.

The present invention relates to an apparatus for stabilizing a direction in space, in which means are provided by which, when undesired rotary movements of the stabilizable material axis of the stabilizing apparatus occur, a member attached to the material axis and acting on the direction to be determined can be additionally adjusted in such a measure that the movement of this member caused by the undesired rotary movement can be made retrograde.

The invention will be described with reference to the accompanying drawings which show three constructions of the invention as applied to the fire control apparatus for naval guns.

Figure 1 is the first construction,

Figure 2 is a view looking from the left of the parts of Figure 1 situated at the gun station and Figures 3 and 4 are the second and third construction.

Figure 4:
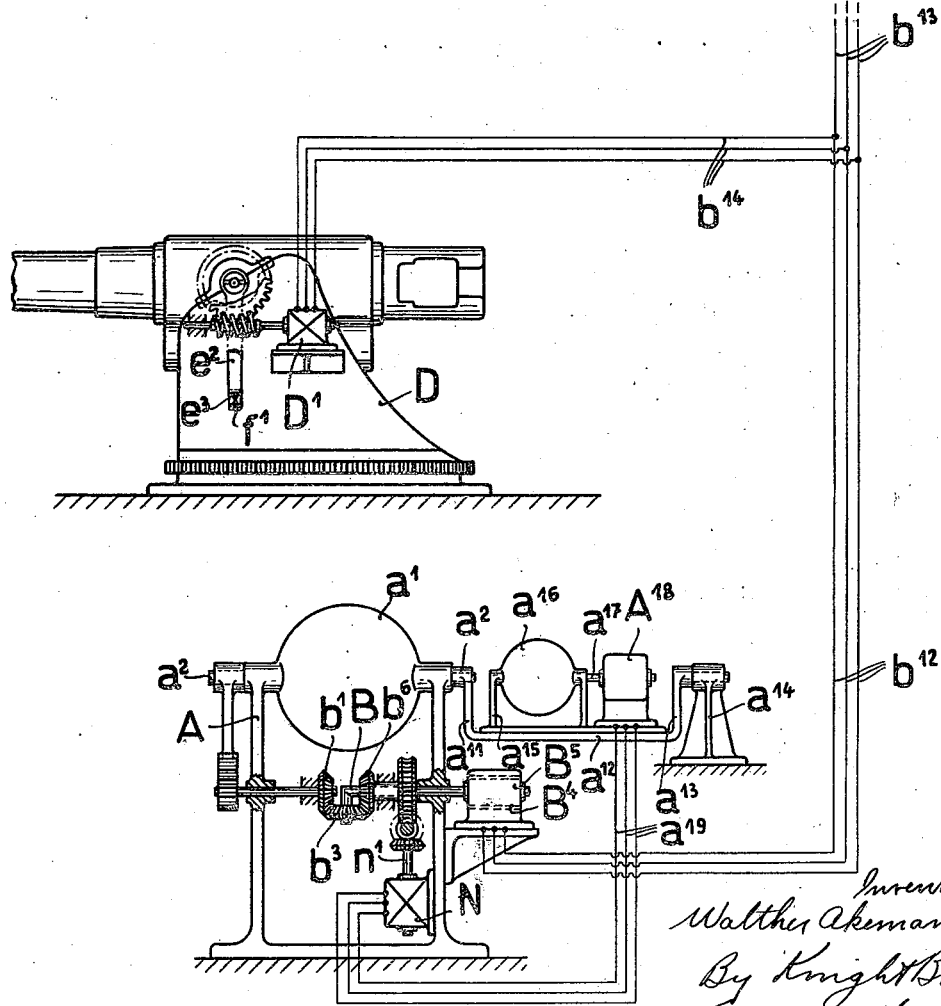

The first construction will be described first.

At an observing station on board the ship is situated a bearing body A adapted to rotate about a vertical axis and encloses by means of a casing $a^1$ a gyroscopic apparatus (not shown) suspended from it by a Cardan suspension. On the one end of the material axis $a^2$ which is stabilizable by the gyroscope and projects through the casing $a^1$ is keyed a toothed sector $a^3$, which is positively connected to the middle wheel $b^1$ of a sun and planet gear by a spur wheel $b^2$. The planet wheel $b^3$ of the sun and planet gear is mounted on the rectangularly bent down end of a shaft B which carries the rotor $B^4$ of a transmitter $B^4$ $B^5$. The other middle wheel $b^6$ is mounted on a hollow shaft $b^7$ which surrounds the shaft B and is positively connected to a hand wheel with the interposition of a self-locking worm gear in the manner shown in the drawing. The other end of the stabilizable material axis $a^2$ carries one middle wheel $a^5$ of a second sun and planet gear, the planet wheel $a^6$ of which is mounted on the rectangularly bent end of a shaft $a^7$ and the other middle wheel $a^8$ on a hollow shaft $a^9$ which surrounds the shaft $a^7$. The shaft $a^7$ which is coaxial with the stabilizable material axis $a^2$ carries on its free end a sighting telescope $A^{10}$ rigidly attached thereto and the hollow shaft $a^9$ is positively connected to the hand wheel C with the interposition of a self-locking worm gear.

From the transmitter $B^4$ $B^5$ a conductor $b^8$ leads to a receiver $D^1$ arranged on the gun carriage D. A pin on the trunnion G and coaxial therewith is loosely and rotatably surrounded by a hollow pin E, which hollow pin E carries a downwardly extending pointer $e^2$, provided on its point with a mark $e^3$ and also carries a worm wheel $e^1$. On the shaft $d^2$ of the rotor (see Figure 2) of the receiver $D^1$ is fixed a worm $d^3$ which engages with the worm wheel $e^1$. A counter mark $f^1$ arranged on the point of a pointer F can be set to coincide with the mark $e^3$ of the pointer $e^2$. The pointer F is so mounted on the trunnion G that it can be adjusted relatively thereto, by an apparatus which is not shown, to correspond to the range of the target and in other respects takes part in the rotary movements of the trunnion.

If the gun which has had the transverse imparted to it by the aid of the fire control apparatus described is to be elevated and fired while the ship is rolling say as it passes through the central position of flotation the pointer F is first adjusted with respect to the trunnion to correspond to the range of the target and then the gun barrel together with the pointer F is so rocked by means of the elevating gear that the counter mark $f^1$ is again opposite the mark $e^3$. The gyroscope at the observing station is also set going and the telescope $A^{10}$ trained on the target by rocking the bearing A about its vertical axis.

If now the ship rolls the stabilizable shaft $a^2$ will tend to retain its angular position in space under the action of the gyroscope and there will accordingly take place between it and the bearing A which takes part in the rolling movements of the ship a relative rotation. This relative rotation is taken part in by the sighting telescope $A^{10}$ through the medium of the gearing $a^5$ $a^6$ $a^7$ in such a way that the said sighting telescope likewise retains its position trained upon the target; the relative rotation is also transmitted by the stabilizable shaft $a^2$ through the medium of the gearing $a^3$ $b^2$ $b^1$ $b^3$ B to the rotor $B^4$ in such a way that the pointer $e^2$, which is positively connected to the corresponding receiver $D^1$ and carries the mark $e^3$ likewise retains its position in space. There therefore takes place a relative rotation between the pointer $e^2$ and the pointer F which takes part in the rolling movements of the gun, and the gun barrel assumes every time its angular position corresponding to the range of the target when the counter mark $f^1$ is opposite the mark $e^3$ when the ship passes through the central position of flotation. At this instant therefore the firing of the gun must take place.

Should there occur during the course of the above described gun laying operation, say for example owing to the influence of the movement of precession of the gyroscope, an undesired but not always avoidable rotary movement of the stabilizable material axis $a^2$, this rotary movement is transmitted on the one hand through the gearing $a^5$ $a^6$ $a^7$ to the sighting telescope $A^{10}$ and on the other hand through the gearing $a^3$ $b^2$ $b^1$ $b^3$ B to the rotor $B^4$ of the transmitter of the long distance control apparatus. The sighting telescope $A^{10}$ does not therefore retain its position trained upon the target, and the pointer $e^2$ connected to the transmitter $B^4$ $B^5$ by means of the long distance controlling apparatus $b^8$, the receiver $D^1$, and the gearing $d^2$ $d^3$ $e^1$ E also changes its angular position in space. In this case the gun layer, who sights the gun by means of the telescope $A^{10}$ rotates the hand wheel C according to the swing of the sighting telescope $A^{10}$ in one direction or the other.

He thereby imparts firstly to the sighting telescope $A^{10}$, which is connected to the hand wheel C in the manner shown in the drawing by the worm gear and the gearing $a^0$ $a^8$ $a^6$ $a^7$, an additional movement. The rotation of the hand wheel C is continued until the sighting telescope $A^{10}$ again assumes its position in which it is trained on the target. The said rotation of the hand wheel C is also transmitted through the medium of the gearing $b^7$ $b^6$ $b^3$ B to the rotor $B^4$ of the transmitter $B^4$ $B^5$ of the long distance controlling apparatus and also to the pointer $e^2$ connected thereto. The arrangement is so devised that the additional movement imparted to the sighting telescope $A^{10}$ by the rotation of the hand wheel C corresponds with that of the pointer $e^2$ in direction and magnitude. As soon therefore during the course of the rotary movement of the hand wheel C, as the sighting telescope again assumes the position in which it is trained upon the target, the pointer $e^2$ has again reached that angular position which it had assumed before the commencement of the undesired rotary movement of the stabilizable material axis $a^2$. The wandering of the rotor $B^4$ of the transmitter of the long distance controlling apparatus and with it of the pointer $e^2$ caused by the undesired rotary movement of the stabilizable material axis $a^2$ is therefore obviated and the movement of the hand wheel C is accordingly checked.

Exactly the same action is obtained in respect of the angular position of the pointer $e^2$, if when undesired rotary movements of the material axis $a^2$ occur, care be taken by suitable rotation of the hand wheel C, to make the sighting telescope $A^{10}$ permanently retain the position in which it is trained on the target.

In the second construction shown in Figure 3 of the accompanying drawings the gyroscopic apparatus (not shown) is suspended by means of a Cardan suspension from a bearing body A which is placed in the interior of the ship and encloses the gyroscopic apparatus by means of a casing $a^1$. The stabilizable material axis of the gyroscopic apparatus is positively connected in a manner corresponding to the first construction by a spur wheel gearing $a^3$ $b^2$ with one of the middle wheels of a sun and planet gear. The planet wheel $b^3$ which is mounted on a rectangularly bent end of a shaft B is positively connected to the rotor $B^4$ of the transmitter $B^4$ $B^5$ of a long distance controlling apparatus. The other middle wheel $b^6$ is positively connected through a self-locking worm gear to a hand wheel $b^9$ the rotation of which can be read off by the position of two counter marks $b^{10}$ and $b^{11}$ of a receiver G constructed on the coarse and fine systems, which receiver G is provided with two pointers $g^1$ and $g^2$ which indicate its angular position and engage with the aforesaid counter marks $b^{10}$ and $b^{11}$. The transmitter $B^4$ $B^5$ of the long distance control apparatus is connected by conductors $b^{12}$, $b^{13}$ and $b^{14}$ with two receivers H and $D^1$ which are connected up in parallel and of which one (H) is located at an observing station on board the ship and serves to drive a sighting telescope J positively connected to it while the other $D^1$ is mounted on the gun carriage D of the gun which is to be laid. The receiver $D^1$ serves in a manner corresponding to the first construction example exactly to stabilize a pointer $e^2$ carrying a mark $e^3$ to which a counter mark $f^1$ which takes part in the movements of the trunnion can be adjusted. This counter mark $f^1$ is located on a pointer F, which is adjustable relatively to the trunnion in a manner, not shown, to correspond to the range of the target. In the vicinity of the sighting telescope J is mounted a transmitter M which can be rotated by means of a hand wheel K in such a way that this hand wheel K lies within the reach of the gun layer who sights the gun by means of the telescope J. To the transmitter M is connected through a long distance conductor $m^1$ the receiver already mentioned which is situated at the gyroscopic apparatus.

During the working of the second construction shown in Figure 3 the gyroscope located in the interior of the ship is set going, so that when the rolling movement of the ship occurs the stabilizable material axis $a^2$ and also the sighting telescope J connected to it by the long distance controlling apparatus $B^4$ $B^5$ $b^{12}$ $b^{13}$ H, and the pointer $e^2$ carrying the mark $e^3$ retain their angular position in space for the time being. In this case the gun laying operation for the gun to be laid is the same as in the corresponding case of the first construction.

If however an undesired rotary movement of the stabilizable material axis $a^2$ occurs the angular position referred to space of the rotor $B^4$ of the transmitter $B^4$ $B^5$ connected to the stabilizable material axis $a^2$ by the gearing $a^3$ $b^2$ $b^1$ $b^3$ B also changes and with it also the angular position of the corresponding receivers H and $D^1$. The sighting telescope J therefore loses its adjustment which previously trained it upon the target and the pointer $e^2$ carrying the mark $e^3$ changes its angular position in space. In this case the gun layer who sights the gun by means of the telescope J rotates the hand wheel K of the transmitter M according to the swing of the telescope J in one direction or the other. The rotation of the transmitter M which is produced hereby is taken part in by the receiver G connected to it by the conductor $m^1$ so that the pointers $g^1$ and $g^2$ change their angular positions. The hand wheel $b^9$ is correspondingly rotated in such a direction that the counter marks $b^{10}$ and $b^{11}$ follow the pointers $g^1$ and $g^2$. This rotation of the hand wheel $b^9$ is transmitted by the self-locking gearing shown in the drawing to the middle wheel $b^6$ of the sun and planet gear $b^1$ $b^3$ $b^6$ and thus effects an additional movement of the rotor $B^4$ of the transmitter $B^4$ $B^5$. This additional movement of the rotor $B^4$ is taken up by the corresponding receivers H and $D^1$ and with them the parts positively connected thereto i. e. the sighting telescope J and the pointer $e^2$ carrying the mark $e^3$.

The rotation of the hand wheels K and $b^9$ takes place in such a direction and is continued for such a time until the gun layer who is doing the sighting through the telescope J once more sees the target in the cross wires of the telescope J. Because when the target again registers with the cross wires of the telescope J the original angular position of the sighting telescope J in which it is trained on the target is restored, and as also the same angular position has been imparted to the pointer $e^2$ by the said rotation of the hand wheel $b^9$ as to the sighting telescope J, the pointer $e^2$ has also again reached that angular position in space which it occupied before the commencement of the undesired rotary movement of the stabilizable material axis $a^2$.

The same action in respect of the angular position of the pointer $e^2$ is attained, if when an undesired rotary movement of the stabilizable material axis $a^2$ occurs, the two hand wheels K and $b^9$ be so rotated that the sighting telescope J permanently retains the position in which it is trained on the target.

In the third construction shown in Figure 4 the gyroscopic apparatus (not shown) is suspended by a Cardan suspension from a bearing body A situated in the interior of the ship and enclosing the gyroscopic apparatus by means of a casing $a^1$. One end of the stabilizing material axis $a^2$ is positively connected in the manner already described to the middle wheel $b^1$ of a sun and planet gear, the planet wheel $b^3$ of which is mounted on the bent end of a shaft B which carries the rotor $B^4$ of a transmitter $B^4$ $B^5$. To the other end of the stabilizable material axis $a^2$ is attached pivotally by means of a crank arm $a^{11}$ keyed thereon a bearing plate $a^{12}$ the other crank arm $a^{13}$ of which is pivotally mounted on a bearing bracket $a^{14}$.

On the bearing plate $a^{12}$ is mounted a bearing body $a^{15}$ to which an auxiliary gyroscopic apparatus (not shown) and enclosed by a casing $a^{16}$ is suspended by a Cardan suspension. On the material axis $a^{17}$ of the auxiliary gyroscopic apparatus which is coaxial with the stabilizable material axis $a^2$ is mounted the rotor of an auxiliary transmitter $A^{18}$ to which an auxiliary receiver N mounted on the bearing body A is connected by a conductor $a^{19}$. The rotor shaft $n^1$ of the auxiliary receiver N is positively connected to the second middle wheel $b^6$ of the sun and planet gear $b^1$ $b^3$ $b^6$ which serves to drive the rotor $B^4$ by a self-locking worm gear, so that an additional angular movement can be imparted to the rotor $B^4$.

The transmitter $B^4$ $B^5$ is connected by conductors $b^{12}$, $b^{13}$ and $b^{14}$ with two receivers H and $D^1$ which are connected up in parallel and of which one (H) is mounted at an observing station on the ship and serves to adjust the position of a sighting telescope J positively connected to it while the other $D^1$, is mounted on the gun carriage D of the gun to be pointed. The receiver $D^1$ serves, in a manner which corresponds exactly to the first two constructions, to stabilize a pointer $e^2$ carrying a mark $e^3$ to which a countermark $f^1$ which can be rocked to correspond to the range of the target and takes part in the movements of the trunnion can be adjusted.

In the working of the third construction shown in Figure 4 the gyroscopes (not shown) of the two gyroscopic apparatus are first set going so that during the rolling movements of the ship the stabilizable material axes $a^2$ and $a^{17}$ and also the sighting telescope J and the pointer $e^2$ with the mark $e^3$ retain their angular position in space for the time being. If however an undesired rotary movement of the stabilizable shaft $a^2$ occurs, the rotor $B^4$ of the transmitter $B^4$ $B^5$ and with it the sighting telescope J connected to the transmitter $B^4$ $B^5$ by the long distance controlling apparatus and also the pointer $e^2$ assume a fresh angular position in space, and the bearing plate $a^{12}$ is also rocked.

This rocking movement of the bearing plate $a^{12}$ is however, as the undesired rotary movements of the stabilizable material axis $a^2$ are only small even in the case of comparatively great rolling movements of the ship, likewise only small, and the auxiliary gyroscopic apparatus has consequently only to produce a small turning moment in order to maintain the angular position of the stabilizable material axis $a^{17}$ in space. During the aforesaid rocking movement of the bearing plate $a^{12}$ the material axis $a^{17}$ is rotated through an angle of rotation which is equal to, but in the opposite direction to the angle of rotation, of the stabilizable material axis $a^2$. This rotary movement of the stabilizable material axis $a^{17}$ is transmitted through the medium of the electrical controlling apparatus $A^{18}$ $a^{19}$ N to the rotor shaft $n^1$, which in its turn imparts through the medium of the gearing $b^6$ $b^3$ B an additional movement to the rotor $B^4$. The arrangement is so devised that the additional movement imparted to the rotor $B^4$ of the transmitter $B^4$ $B^5$ when the bearing plate $a^{12}$ makes its rocking movement is equal and opposite at every instant to the movement which the rotor would take up through the medium of the gearing $b^1$ $b^3$ B when the undesired rotary movement of the stabilizable material axis $a^2$ occurs. The rotor $b^4$ and with it also the sighting telescope J and the pointer $e^2$ therefore retain even when undesired rotary movements of the stabilizable material axis $a^2$ occur, automatically that angular position in space which they assume at the commencement of the said undesired rotary movement.

The arrangements which form the subject matter of the invention offer the possibility of stabilizing in space a member which determines a direction without its being necessary to exert on the gyroscopic apparatus which stabilizes the material axis $a^2$ a force influencing the angular position of the material axis so long as the undesired rotary movements of this axis do not assume too high a value.

Claims:

1. An apparatus for stabilizing a direction in space, comprising a stabilizing device, a sighting member attached to the material axis of said stabilizing device and influencing the direction to be fixed, an electrical long distance controlling apparatus containing a transmitter and a receiver and connecting the stabilizable material axis to a member which fixes a direction, mechanical connection between said material axis and the rotor of said transmitter; and means for additionally adjusting said sighting member and said rotor.

2. An apparatus for stabilizing a direction in space, comprising a stabilizing device, a sighting member attached to the material axis of said stabilizing device and influencing the direction to be fixed, an electrical long distance controlling apparatus containing a transmitter and a receiver and connecting the stabilizable material axis to a member which fixes a direction, mechanical connection between said material axis and the rotor of said transmitter; a sighting member adapted to take part in the rotary movement of said material axis; and means for additionally adjusting said rotor and said sighting member simultaneously.

3. An apparatus for stabilizing a direction in space for use in combination with a gun comprising a stabilizing device, a sighting means connected to and stabilized by said stabilizing device, an indicator connected with said gun and adapted to move therewith, a second indicator cooperating with said first mentioned indicator, an electrical long distance controlling apparatus connecting said second indicator to said stabilizing device and means for correcting the position of said sighting means and second indicator a corresponding amount to offset the influence of precession of the stabilizing device.

4. An apparatus for stabilizing a direction in space for use in combination with a gun comprising a stabilizing device, a shaft attached to the material axis of said stabilizing device and influencing the direction to be fixed, an indicator connected to rotate with said gun, a second indicator cooperating with said first mentioned indicator, an electrical long distance controlling apparatus containing a transmitter and a receiver and connecting said last mentioned indicator to the stabilizable material axis, a sighting means connected to and stabilized by said stabilizing device and means for simultaneously correcting the position of said sighting means and second indicator a corresponding amount to offset the influence of precession of the stabilizing device.

5. An apparatus of the class described comprising a gyroscopic apparatus, a sighting means, a gear connection between said sighting means and gyroscopic apparatus whereby said sighting means will be stabilized, a gun, an indicator secured to said gun and adapted to rotate therewith, a cooperating indicator, an electrical long distance controlling apparatus containing a transmitter and a receiver for connecting said indicator to said gyroscopic apparatus, a gear connection between said gyroscopic apparatus and the transmitter of said distance controlling apparatus and means connected to both of said gear connections for adjusting the same whereby the position of said sighting means and last mentioned indicator may be altered simultaneously to a corresponding amount to offset the influence of precession of the stabilizing device.

The foregoing specification signed at Essen, Germany, this 16th day of June, 1920.

DR. WALTHER AKEMANN.

In presence of—
HANS GOTTSMANN,
JOSEF OLBERTZ.